United States Patent
Schissel et al.

(10) Patent No.: US 10,050,911 B2
(45) Date of Patent: Aug. 14, 2018

(54) PROFILE COMPLETION SCORE

(71) Applicant: Microsoft Technology Licensing, LLC, Redmond, WA (US)

(72) Inventors: Jason Schissel, Mountain View, CA (US); Alexis Blevins Baird, San Francisco, CA (US); Xin Fu, Sunnyvale, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 182 days.

(21) Appl. No.: 14/835,610

(22) Filed: Aug. 25, 2015

(65) Prior Publication Data
US 2017/0063740 A1    Mar. 2, 2017

(51) Int. Cl.
*H04L 12/58* (2006.01)
*H04L 29/08* (2006.01)

(52) U.S. Cl.
CPC ........... *H04L 51/046* (2013.01); *H04L 67/22* (2013.01); *H04L 67/306* (2013.01)

(58) Field of Classification Search
CPC ..... H04L 51/046; H04L 67/22; H04L 67/306; G06Q 30/0224; G06Q 50/01; G06F 17/3053; G06F 17/30598; G06F 17/30864
See application file for complete search history.

(56) References Cited

U.S. PATENT DOCUMENTS

| | | | |
|---|---|---|---|
| 8,990,191 B1* | 3/2015 | Liu | G06F 17/30598 705/14.45 |
| 9,047,383 B1* | 6/2015 | Banadaki | G06Q 50/01 |
| 9,131,019 B2* | 9/2015 | Lessin | H04L 65/403 |
| 2005/0159970 A1* | 7/2005 | Buyukkokten | G06Q 30/02 705/319 |
| 2006/0047725 A1* | 3/2006 | Bramson | G06F 21/604 |
| 2010/0076775 A1* | 3/2010 | Tesler | G06Q 50/01 705/319 |
| 2012/0166532 A1* | 6/2012 | Juan | G06Q 50/01 709/204 |
| 2014/0143325 A1* | 5/2014 | Lessin | H04L 65/403 709/204 |

(Continued)

*Primary Examiner* — Vivek Srivastava
*Assistant Examiner* — Todd L Barker
(74) *Attorney, Agent, or Firm* — Schwegman Lundberg & Woessner, P.A.

(57) ABSTRACT

Techniques for tracking profile completeness among members of an online social networking system are described. According to various embodiments, profile completion score criteria information identifies a profile completion score weight value associated with each of a plurality of member profile fields available in member profiles of an online social networking service. A specific member profile associated with a specific member of the online social networking service is accessed, and one or more of the plurality of member profile fields that have been completed in the specific member profile are identified. Thereafter, the profile completion score weight values associated with the member profile fields that have been completed in the specific member profile are determined, based on the profile completion score criteria information. Based on the determined profile completion score weight values, a profile completion score is then generated for the specific member profile.

20 Claims, 11 Drawing Sheets

(56) References Cited

U.S. PATENT DOCUMENTS

| | | | |
|---|---|---|---|
| 2015/0150100 A1* | 5/2015 | Soni | H04L 63/0876 726/7 |
| 2015/0378533 A1* | 12/2015 | Landau | G06F 3/0483 715/776 |
| 2016/0055010 A1* | 2/2016 | Baird | G06F 9/4446 707/727 |

* cited by examiner

| MEMBER PROFILE FIELD | WEIGHT |
|---|---|
| Position1 | 17 |
| Patent | 16 |
| Industry | 10 |
| Skill | 9 |
| Picture | 5 |
| Edu1 | 6 |
| Publication | ... |
| Location | ... |
| Position3 | ... |
| Position2 | ... |

*FIG. 5*

PROFILE COMPLETION SCORE

TECHNICAL FIELD

The present application relates generally to data processing systems and, in one specific example, to techniques for tracking profile completeness among members of an online social networking system, and techniques for determining online content to provide to members of the online social networking system based on profile completeness.

BACKGROUND

Online social network services such as LinkedIn® are becoming increasingly popular, with many such websites boasting millions of active members. Each member of the online social network service is able to upload an editable member profile page to the online social network service. The member profile page may include various information about the member, such as the member's biographical information, photographs of the member, and information describing the member's employment history, education history, skills, experience, activities, and the like. Such member profile pages of the networking website are viewable by, for example, other members of the online social network service.

BRIEF DESCRIPTION OF THE DRAWINGS

Some embodiments are illustrated by way of example and not limitation in the figures of the accompanying drawings in which:

FIG. 5 illustrates an example of profile completion score criteria information, according to various embodiments;

DETAILED DESCRIPTION

Figure 1:
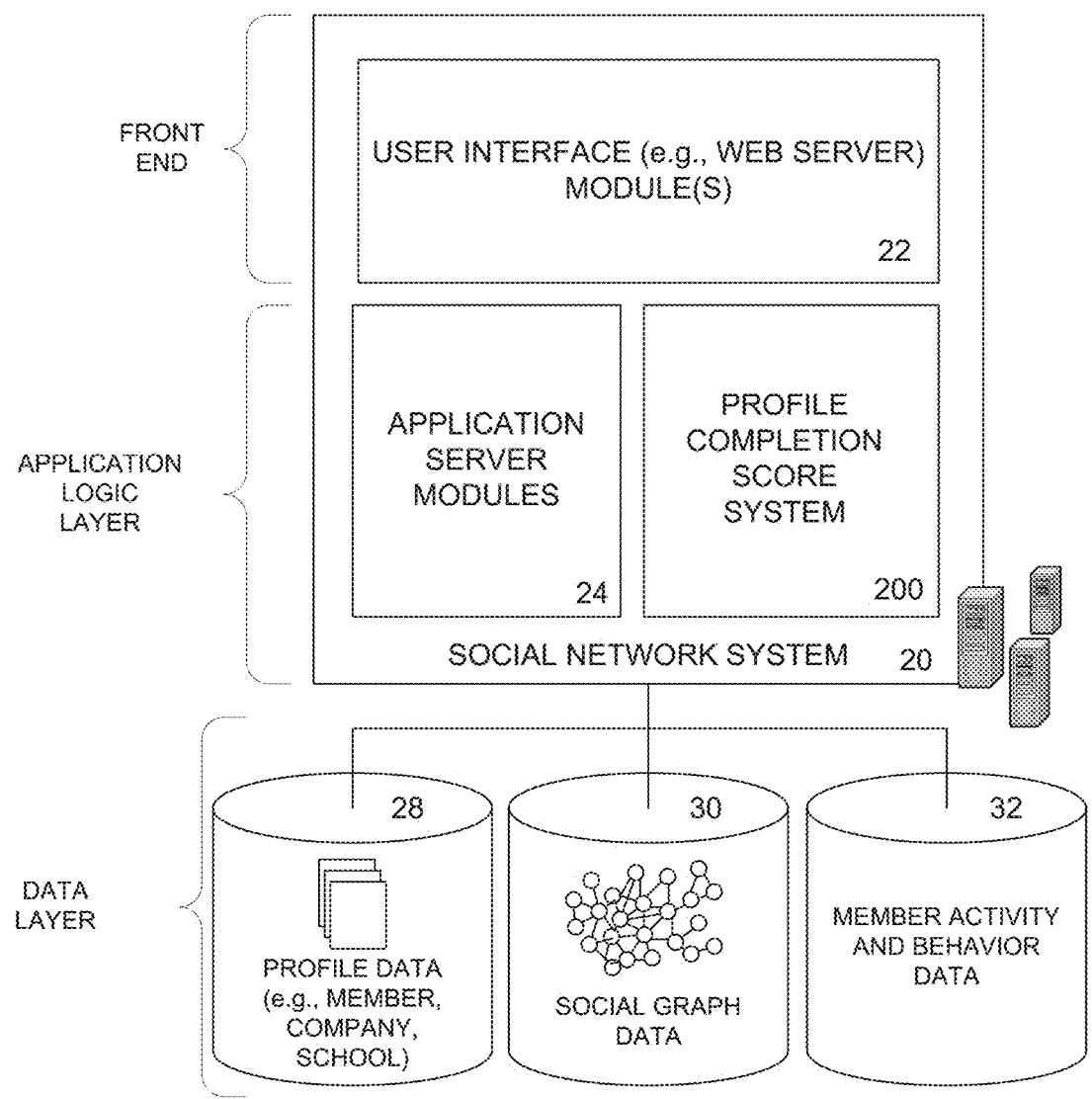
FIG. 1 is a block diagram showing the functional components of a social networking service, consistent with some embodiments of the present disclosure.

Example methods and systems for tracking profile completeness among members of an online social networking system, and for determining online content to provide to members of the online social networking system based on profile completeness, are described. In the following description, for purposes of explanation, numerous specific details are set forth in order to provide a thorough understanding of example embodiments. It will be evident, however, to one skilled in the art that the embodiments of the present disclosure may be practiced without these specific details.

According to various example embodiments, a system is configured to calculate a profile completion score associated with each member profile of an online social networking service such as LinkedIn®. The profile completion score provides an indication of the completeness of the member profile, based on which member profile fields or sections in the profile have been completed. In particular, a system is configured to determine a weight value associated with each member profile field available in a member profile. For example, completion of the "patent" profile field may be worth 16 points, completion of the "profile picture" field may be worth 5 points, and so on. Accordingly, based on the member profile fields a particular member has completed, their profile completion score may be calculated by, for example, summing the weight values of each of the member profile fields that have been completed.

In some embodiments, the weight values associated with each member profile field indicates the value that a member receives based on the completed member profile field (e.g., in terms of profile views received, messages received, connection invitations received, prominence in search results, etc.). In particular, a weight value for a given member profile second indicates, all else being equal, what is the difference in value that member receives if they have that field versus if they don't have that field. Thus, suppose that two profiles are the same except one has a profile picture and the other doesn't have a profile picture; the weight value for the profile picture field will indicate the difference in value due to having the profile picture versus not having the profile picture. In some alternative embodiments, the weight values associated with each member profile field instead (or in addition) indicates the value that the greater social network ecosystem receives (e.g., in terms of total page views on site, total ad clicks on site, etc.), based on having the completed member profile field.

In some embodiments, the weights for the member profile fields may be used to suggest which fields a member should prioritize completing. For example, if a member has not completed 10 fields, a system may suggest that the member complete the missing field with the highest weight value, rather than suggest that the member complete all 10 missing fields. Accordingly, the system described herein provides members with recommendations for fields to complete, which reduces the need for every member to attempt to complete every missing field in their member profile. This may result in a reduction in the processing power and network bandwidth demands placed on online social networking service hardware and software infrastructure.

Given the large number of member profiles that exist on an online social networking service such as Linkedin®, the profile completion score described herein provides a resource for comparing different profiles at a macro level. For example, if a first user profile only has a completed education field, skills field, and profile picture field, then the profile completion score provides a measure of whether this profile is in some way better or worse than, for example, another profile that only has a completed company field and status field. Moreover, the profile completion score described herein provides a metric to track profile completion progress over a member base over time, based on changes in profile completion scores over time (e.g., to answer questions such as how has the average profile completion score of members changed over 6 months, or what percentage of members have a profile completion score below X now versus 6 months ago). Moreover, the profile completion score described herein provides a resource to test whether a new feature has a net positive/negative effect for profile completion. For example, an A/B test may be performed on the feature, and the change in profile completion score as a result of implementation of the profile feature may be analyzed (e.g., if the profile completion score increases in cases whether the feature is implemented, this feature may be categorized as having a beneficial effect on member profile completeness).

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a profile completion score system 200. The profile completion score system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
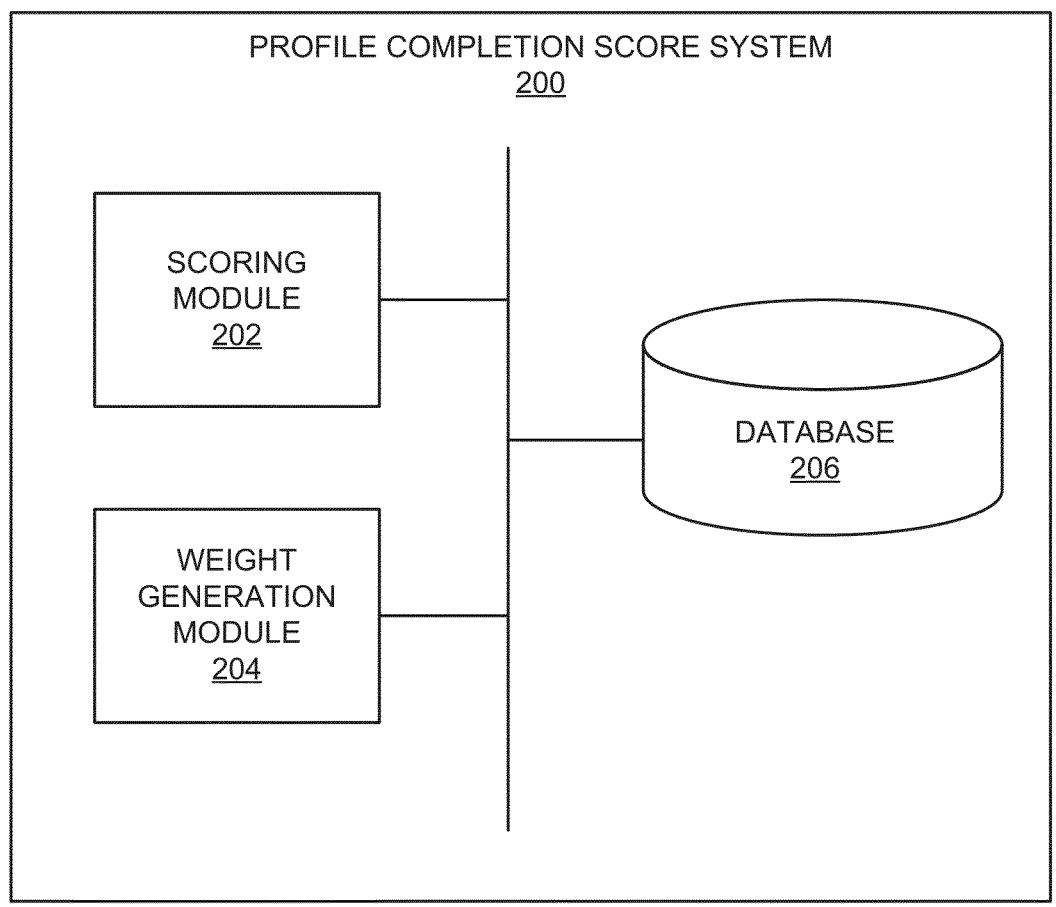
FIG. 2 is a block diagram of an example system, according to various embodiments.

Turning now to FIG. 2, a profile completion score system 200 includes a scoring module 202, a weight generation module 204, and a database 206. The modules of the profile completion score system 200 may be implemented on or executed by a single device or on separate devices interconnected via a network (e.g., one or more client machines or application servers). The operation of each of the aforementioned modules of the profile completion score system 200 will now be described in greater detail in conjunction with the various figures.

Figure 3:
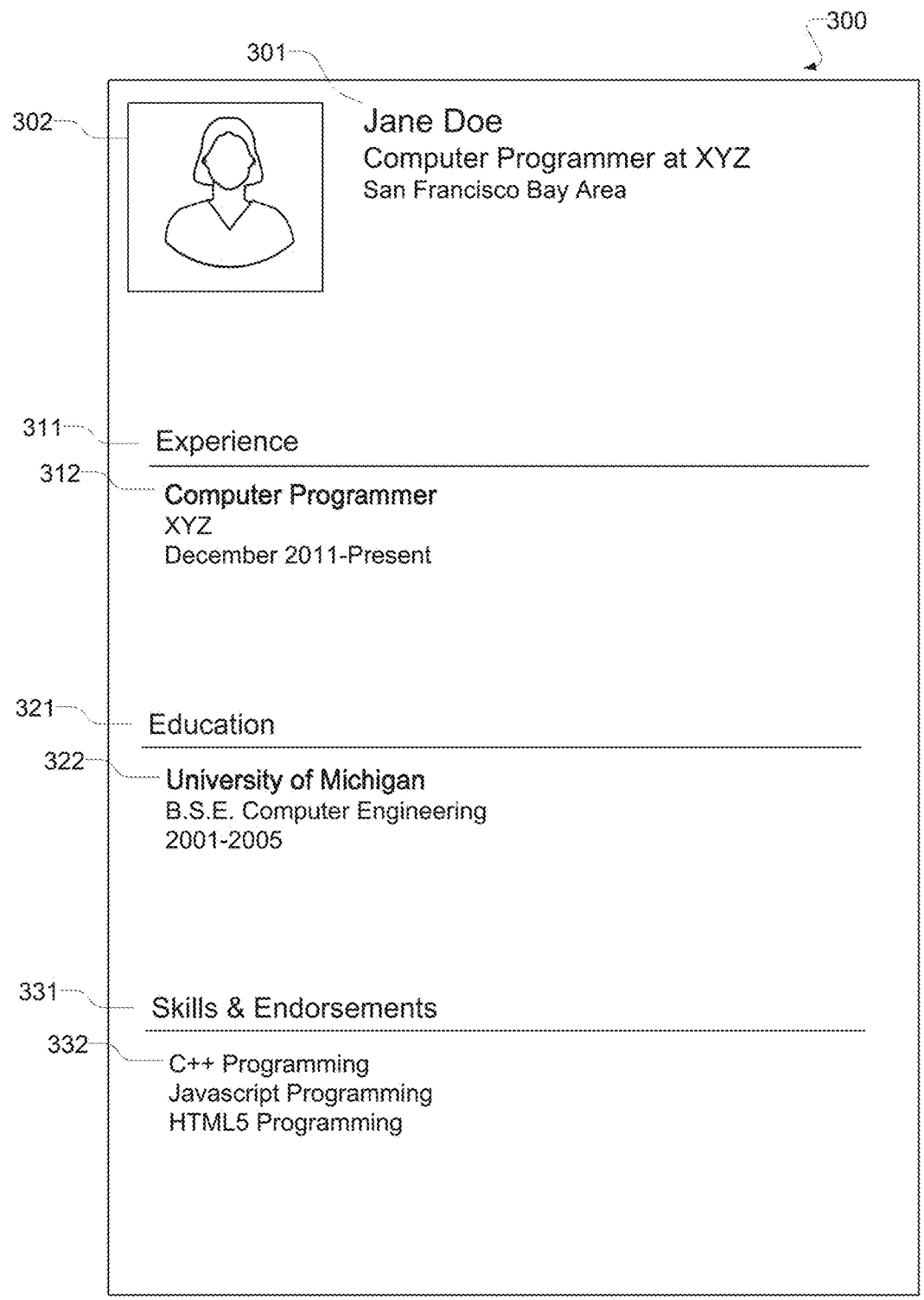
FIG. 3 illustrates an example member profile page, according to various embodiments.

Generally, each member of an online social network service (such as LinkedIn®) has a member profile page that includes various information about that member. An example member profile page 300 of an example member "Jane Doe" is illustrated in FIG. 3. As seen in FIG. 3, the member profile page 300 includes identification information 301, such as the member's name ("Jane Doe"), member's current position, ("Computer Programmer at XYZ"), and geographic address/location information ("San Francisco Bay Area"). The member's profile page 300 also includes a photo area 302 for displaying a photograph of the member. Further, the member profile page 300 includes various sections (also known as fields). For example, member profile page 300 includes an experience section 311 including listings of past or present experience positions of the member (e.g., employment/volunteer experience position 312), an education section 321 including listings of past or present educational credentials of the member (e.g., university degree or diploma 322 earned or currently being earned by the member), and a skills & endorsements section 331 including listings of various skills of the member and endorsements of those skill listings by other members. Member profile page 300 is merely exemplary, and while the member profile page 300 includes certain sections (e.g., experience sections and education sections), these sections or fields may be supplemented or replaced by other sections or fields (e.g., a general portfolio section/field, an art portfolio section/field, a music portfolio section/field, a photography portfolio section/field, a multimedia section/field, a volunteer section/field, and so forth). A member profile page may include other information, such as various identification information (name, username, social media handle, email address, geographic address, networks, location, phone number, fax number, etc.), past or present education information, past or present employment information, past or present volunteer information, resume information, skills, endorsements, recommendations, title, industry, company size, seniority level, activities, group membership, images, photos, preferences, news, status, links or URLs on the profile page, and so forth.

Figure 4:
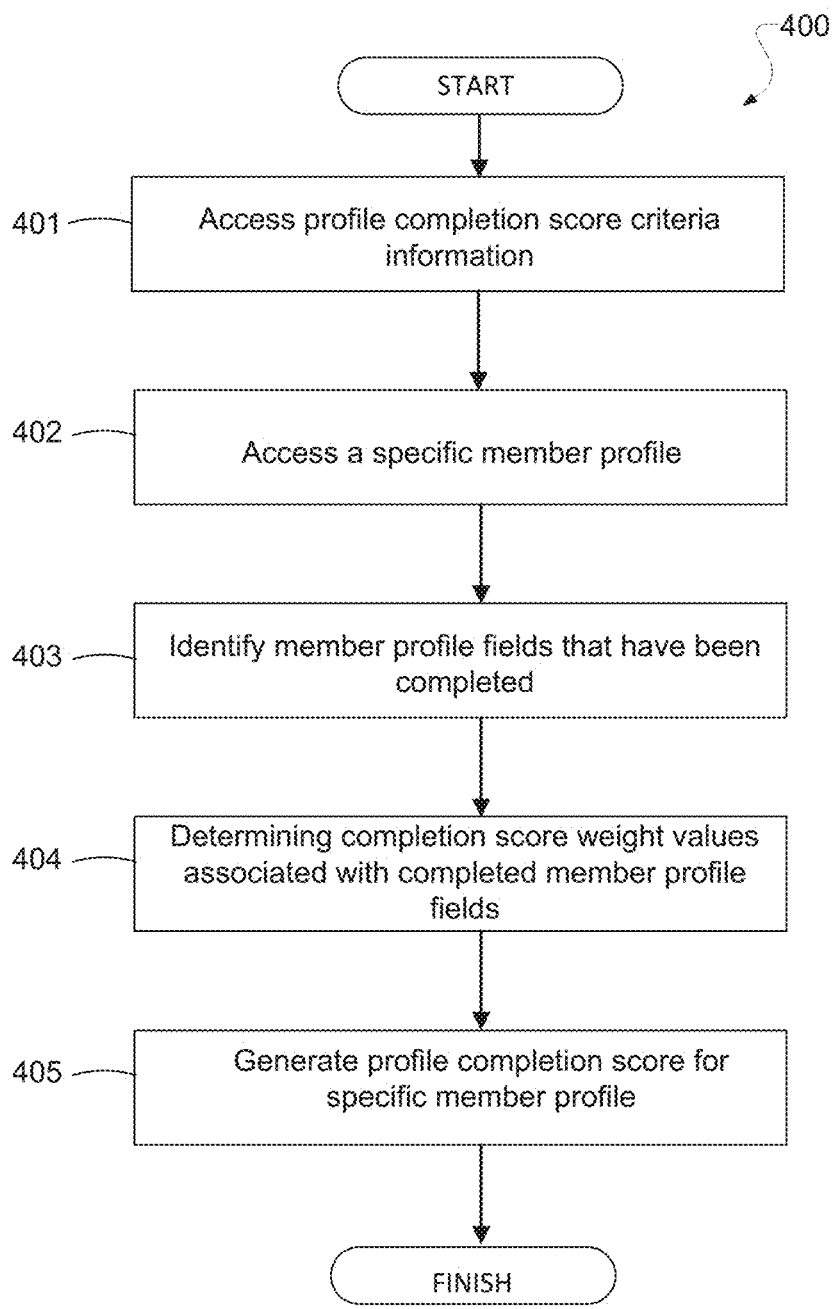
FIG. 4 is a flowchart illustrating an example method, according to various embodiments.

FIG. 4 is a flowchart illustrating an example method 400, consistent with various embodiments described herein. The method 400 may be performed at least in part by, for example, the profile completion score system 200 illustrated in FIG. 2 (or an apparatus having similar modules, such as one or more client machines or application servers). In operation 401, the scoring module 202 accesses, from one or more databases, profile completion score criteria information identifying a profile completion score weight value associated with each member profile field available in member profiles of an online social networking service. More specifically, each profile completion score weight value indicates a relative measure of the value of that member profile field when it is completed. In some embodiments, the plurality of member profile fields includes a profile picture, a company section, an education section, a certification section, an honors section, a project section, a course section, a volunteer section, a skills section, an industry section, a location section, an awards section, a publication section, and a patent section. FIG. 5 illustrates example profile completion score criteria information 500 identifying various member profile fields (e.g., "Position1", "Patent", "Industry", etc.), and a profile completion score weight value associated with each member profile field (e.g., "17", "16", "10", etc.). The profile completion score criteria information 500 may be stored in a database or data storage device (e.g., database 206 illustrated in FIG. 2). As illustrated in FIG. 5, there may be more than one position field (e.g., Position1, Position2, Position3, etc.) and more than one education field (e.g., Edu1, Edu2, Edu3, etc.), where Position1 may correspond to a current or most recent position (e.g., current job) and Edu1 may correspond to a current or most recent educational credential (e.g., university degree). Thus, a weight may be associated with each of these positions (e.g., Position1, Position2, Position3, etc.) and each education field (e.g., Edu1, Edu2, Edu3, etc.), consistent with the embodiments described herein. In other embodiments, member profiles may only include a single position field and/or a single education field. The fields in FIG. 5 are merely exemplary, and the techniques described herein may be applied to other fields, such as certifications, treasury, honors, summary, projects, organization, courses, tests, volunteer positions, position description, etc.

In operation 402, the scoring module 202 accesses, from one or more databases, a specific member profile associated with a specific member of the online social networking service. In operation 403, the scoring module 202 identifies member profile fields that have been completed in the specific member profile accessed in operation 402. In operation 404, the scoring module 202 determines, based on the profile completion score criteria information accessed in operation 403, the profile completion score weight values associated with the member profile fields that have been completed in the specific member profile. For instance, with reference to the example profile completion score criteria information 500 in FIG. 5, if a member profile only has Position1, Industry, and Edu1 completed, then the corresponding profile completion score weight values will be 17, 10, and 6, respectively. In operation 405, the scoring module 202 generates, based on the profile completion score weight values determined in operation 404, a profile completion score for the specific member profile. For example, the scoring module 202 may calculate the sum of the profile completion score weight values determined in operation 404. For example, for the member profile that only has Position1, Industry, and Edu1 completed, the corresponding profile completion score will be 33, or the sum of the profile completion score weight values of 17, 10, and 6. In alternative embodiments, the profile completion score may correspond to the average of the profile completion score weight values determined in operation 404. For example, for the member profile that only has Position1, Industry, and Edu1 completed, the corresponding profile completion score will be 11, or the average of the profile completion score weight values of 17, 10, and 6. In some embodiments, the scoring module 202 may display the generated profile completion score via a user interface (e.g., a user interface on a device of the specific member described in operation 402). It is contemplated that the operations of method 400 may incorporate any of the other features disclosed herein. Various operations in the method 400 may be omitted or rearranged.

In some embodiments, each profile completion score weight value associated with each member profile field indicates a relative predicted effect on an outcome metric as result of completing the respective member profile field in comparison to not completing the respective member profile field. For example, the outcome metric may correspond to a quantity of profile views received, a prominence of a member profile in search results, a quantity of messages received via a member profile, or a quantity of connection invitations received via a member profile. In some embodiments, the outcome metric may correspond to a profile value score associated with a member or their member profile, where the profile value score is a score that represents the degree to which the member has received opportunities. Profile value scores are described in detail in pending U.S. patent application Ser. No. 14/815,835, filed Jul. 31, 2015, which is incorporated herein by reference. Thus, each profile completion score weight value associated with each member profile field may reflect a value to the member in completing the respective member profile field in comparison to not completing the respective member profile field. Instead or in addition, the outcome metric may correspond to a total quantity of page views performed at the online social networking service, or a total quantity of advertisement clicks performed at the online social networking service. Thus, each profile completion score weight value associated with each member profile fields may reflect a value to the greater online social networking ecosystem in completing the respective member profile field in comparison to not completing the respective member profile field.

In some embodiments, the weight generation module 204 is configured to determine the profile completion score weight values, based on analyzing coefficients associated with a final machine learned model. For example, the final machine learned model may correspond to a function including a series of variables corresponding to various member profile fields and coefficients associated with each of the variables, and the coefficient for a variable associated with a member profile field may be classified as the profile completion score weight for that corresponding member profile field.

The final machine learned model described above may be generated in accordance with the method 600. In particular, the final model may correspond to the average of several trained outcome-specific machine learned models each configured to predict the value of a specific outcome metric associated with a given member profile, based on the completion status (complete or incomplete) of the member profile fields of that profile.

The weight generation module 204 may train each of the outcome-specific models to predict the value of a specific outcome metric based on training data indicating, for each of a large number of members, known values of the outcome metrics and the completion status of various member profile fields. For example, feature data associated with a large number of members (e.g., 1 million members) may be accessed, where the feature data for each member may be stored in a feature vector, such as [0, 1, 0, 1, 0 . . . 0, 0, 1, 1, 437]. For example, each feature in the feature vector (other than the last feature) may correspond to a member profile field, where a 1 stored in the corresponding position in the feature vector indicates that member profile field is completed, and a 0 stored in the corresponding position feature vector indicates that the member profile field is not completed. The last feature in each feature vector may include a value of the relevant outcome metric, such as profile views for that profile (e.g., 457 views, etc.). Based on these feature vectors, a machine learning model (such as a linear regression model) may be trained to predict the value of the specific outcome metric associated with a given member profile, based on the completion status of the member profile fields in that profile. The weight generation module 204 may repeat this process for each outcome metric, in order to generate a number of outcome-specific machine learned models, such as a model for predicting the value of the outcome metric of quantity of messages received, a model for predicting the value of the outcome metric of total quantity of advertisement clicks performed at the online social networking service, and so on. Finally, all of the outcome-specific machine learned models may be averaged and normalized to generate a single final machine learned model.

In some embodiments, the different outcome-specific machine learned models may be weighted differently before being averaged to generate the single final machine learned model (e.g., to reflect that a particular outcome metric is more important by weighting the model for that outcome metric more greatly). It is understood that any combination or number of outcome-specific machine learned models may be utilized to generate the final machine learned models. For example, in some embodiments, only models for the outcome metrics that represent value to members (e.g., a quantity of profile views received, a prominence of a member profile in search results, a quantity of messages received via a member profile, and a quantity of connection invitations received via a member profile) are averaged to generate the final machine learned model. Alternatively, in some embodiments, only models for the outcome metrics that represent value to the greater social networking ecosystem (e.g., a total quantity of page views performed at the online social networking service and a total quantity of advertisement clicks performed at the online social networking service) are averaged to generate the final machine learned model.

Figure 6:
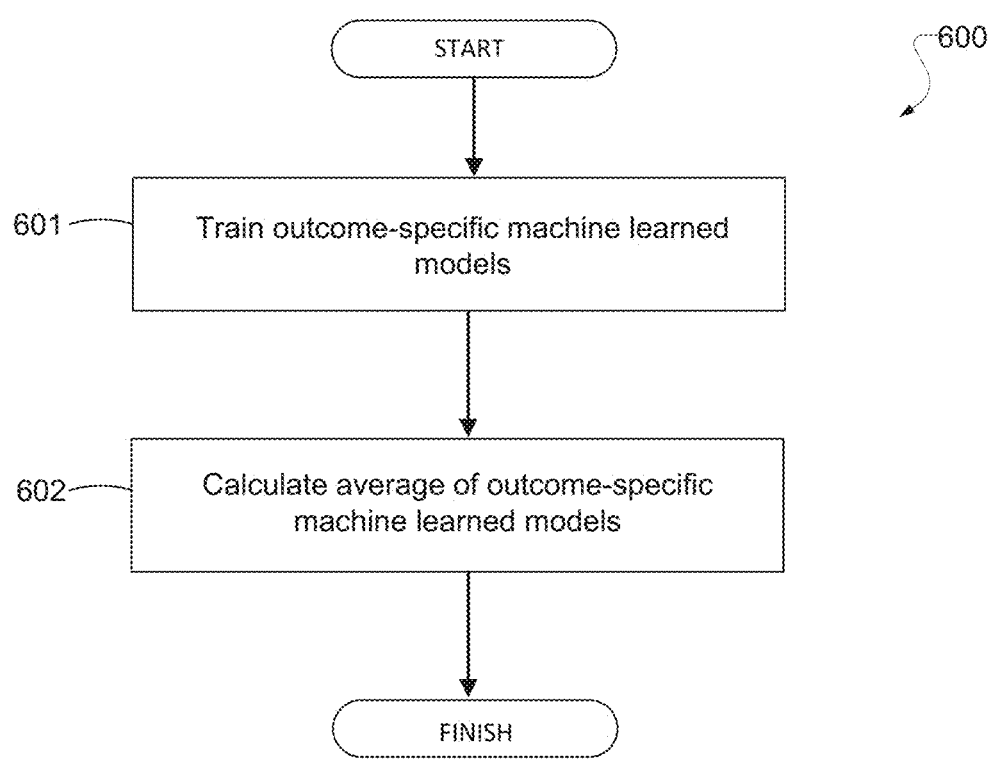
FIG. 6 is a flowchart illustrating an example method, according to various embodiments.

FIG. 6 is a flowchart illustrating an example method 600, consistent with various embodiments described herein. The method 600 may be performed at least in part by, for example, the profile completion score system 200 illustrated in FIG. 2 (or an apparatus having similar modules, such as one or more client machines or application servers). In operation 601, the weight generation module 204 trains, for each of a plurality of outcome metrics, an outcome-specific machine learned model configured to predict a value of the corresponding outcome metric based on a given completion status for each member profile field in a given member profile. For example, the weight generation module 204 may access a set of feature data associated with each of a plurality of members of the online social networking service, each set of feature data indicating a completion status for each of the plurality of member profile fields associated with the corresponding member and a value of the appropriate outcome metric. The weight generation module 204 may then train, based on the feature data, the corresponding outcome-specific machine learned model. The weight generation module 204 will perform this training process for each outcome-specific machine learned model. In operation 602, the weight generation module 204 calculates the average of the outcome-specific machine learned models trained in operation 601. It is contemplated that the operations of method 600 may incorporate any of the other features disclosed herein. Various operations in the method 600 may be omitted or rearranged.

In some embodiments, the profile completion score system 200 may utilize a profile completion score of a member to determine what types of emails to send to the member, in conjunction with various email campaigns. For example, members with lower profile completion scores may be targeted for emails that encourage and assist them with completing their profile or various fields therein. On the other hand, members with high profile completion scores may be less interested in content encouraging them to complete their profile, and may be more interested in, for example, utilizing their profile as a publishing platform (e.g., posting rich media or a portfolio of their best work).

Figure 7:
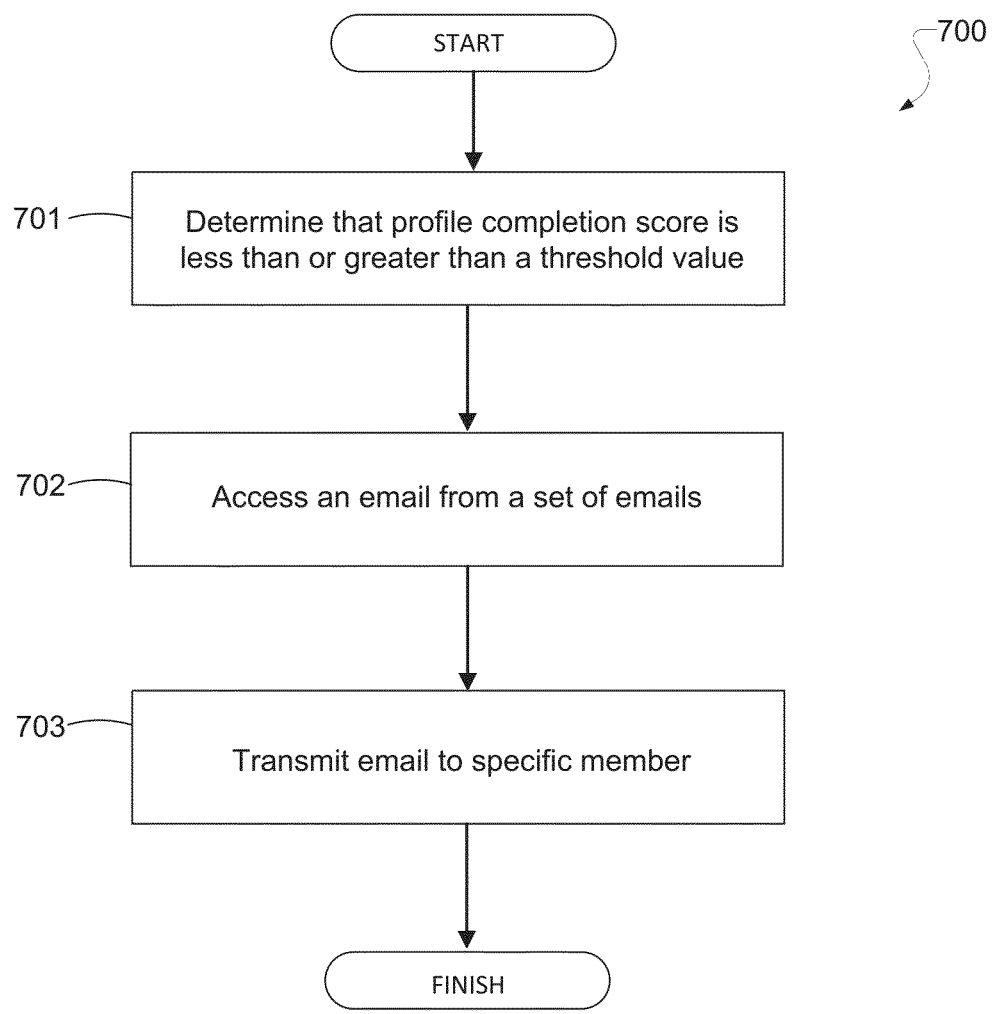
FIG. 7 is a flowchart illustrating an example method, according to various embodiments.

FIG. 7 is a flowchart illustrating an example method 700, consistent with various embodiments described herein. The method 700 may be performed at least in part by, for example, the profile completion score system 200 illustrated in FIG. 2 (or an apparatus having similar modules, such as one or more client machines or application servers). In operation 701, the scoring module 202 determines that a profile completion score (e.g., the profile completion score calculated in operation 405) is less than, greater than, or equal to a threshold value. In operation 702, the scoring module 202 accesses an email from a set of one or more emails, based on the result of the determination in operation 701. For example, if the scoring module 202 determines that the profile completion score is less than (or equal to) a threshold value, the scoring module 202 accesses an email from a set emails targeted at members having incomplete member profiles (e.g., where the email includes recommendations or advantages associated with completing a member profile). Alternatively, if the scoring module 202 determines that the profile completion score is greater than (or equal to) a threshold value, the scoring module 202 accesses an email from a set of emails targeted at members having complete member profiles (e.g., where the email includes advanced recommendations for utilizing their member profile as a publishing platform). In operation 703, the scoring module 202 transmits the email accessed in operation 702 to the specific member associated with the profile completion score referred to in operation 701. While some examples herein refer to emails, the techniques described herein are applicable to any type of electronic message, including an e-mail, text message (e.g., a short messaging service (SMS) message, a multimedia messaging service (MMS) message, etc.), an instant message associated with an online social network (e.g., Facebook®, LinkedIn®, Wechat®, WhatsApp®, etc.), a chat message associated with an online chat service, and so on. It is contemplated that the operations of method 700 may incorporate any of the other features disclosed herein. Various operations in the method 700 may be omitted or rearranged.

Figure 8:
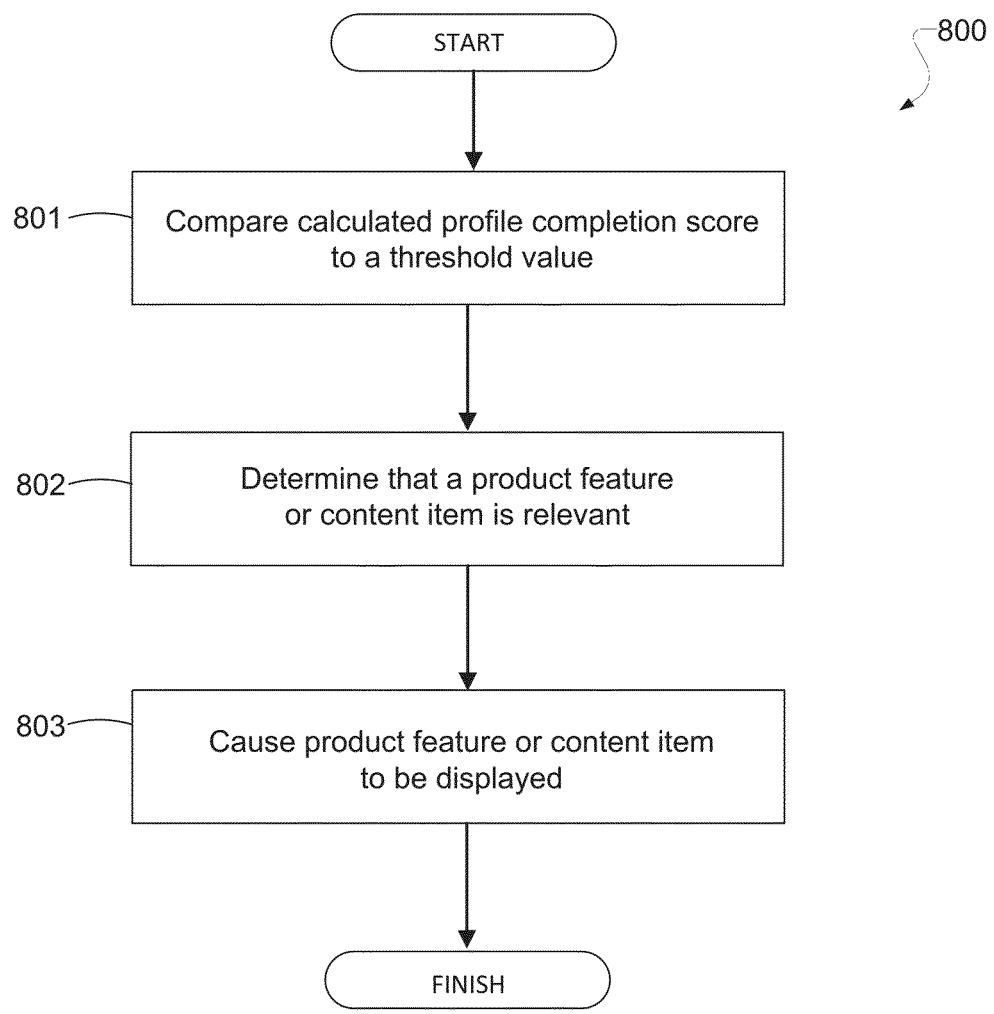
FIG. 8 is a flowchart illustrating an example method, according to various embodiments.

In some embodiments, the profile completion score system 200 may utilize a profile completion score of a member to determine what online content or webpage feature to display to a member. Thus, profile completion scores may be utilized as a feature in any relevance algorithm for determining whether to display any content or feature on site to a member. For example, FIG. 8 is a flowchart illustrating an example method 800, consistent with various embodiments described herein. The method 800 may be performed at least in part by, for example, the profile completion score system 200 illustrated in FIG. 2 (or an apparatus having similar modules, such as one or more client machines or application servers). In operation 801, the scoring module 202 compares a profile completion score associated with a specific member (e.g., the profile completion score calculated in operation 405) to a threshold value. In operation 802, the scoring module 202 determines that a product feature or content item is relevant to the specific member, based on the comparison performed in operation 801. For example, if the profile completion score is greater than (or equal to) the threshold value, then the scoring module 202 may determine that the product feature or content item is relevant to the specific member, and if the profile completion score is less than (or equal to) the threshold value, then the scoring module 202 may determine that the product feature or content item is not relevant to the specific member. In some alternative embodiments, if the profile completion score is less than (or equal to) the threshold value, then the scoring module 202 may determine that the product feature or content item is relevant to the specific member, and if the profile completion score is greater than (or equal to) the threshold value, then the scoring module 202 may determine that the product feature or content item is not relevant to the specific member. In operation 803, in response to determining in operation 802 that the product feature or content item is relevant to the specific member, the scoring module 202 causes the product feature or content item to be displayed, via a user interface, to the specific member. It is contemplated that the operations of method 800 may incorporate any of the other features disclosed herein. Various operations in the method 800 may be omitted or rearranged.

Figure 9:
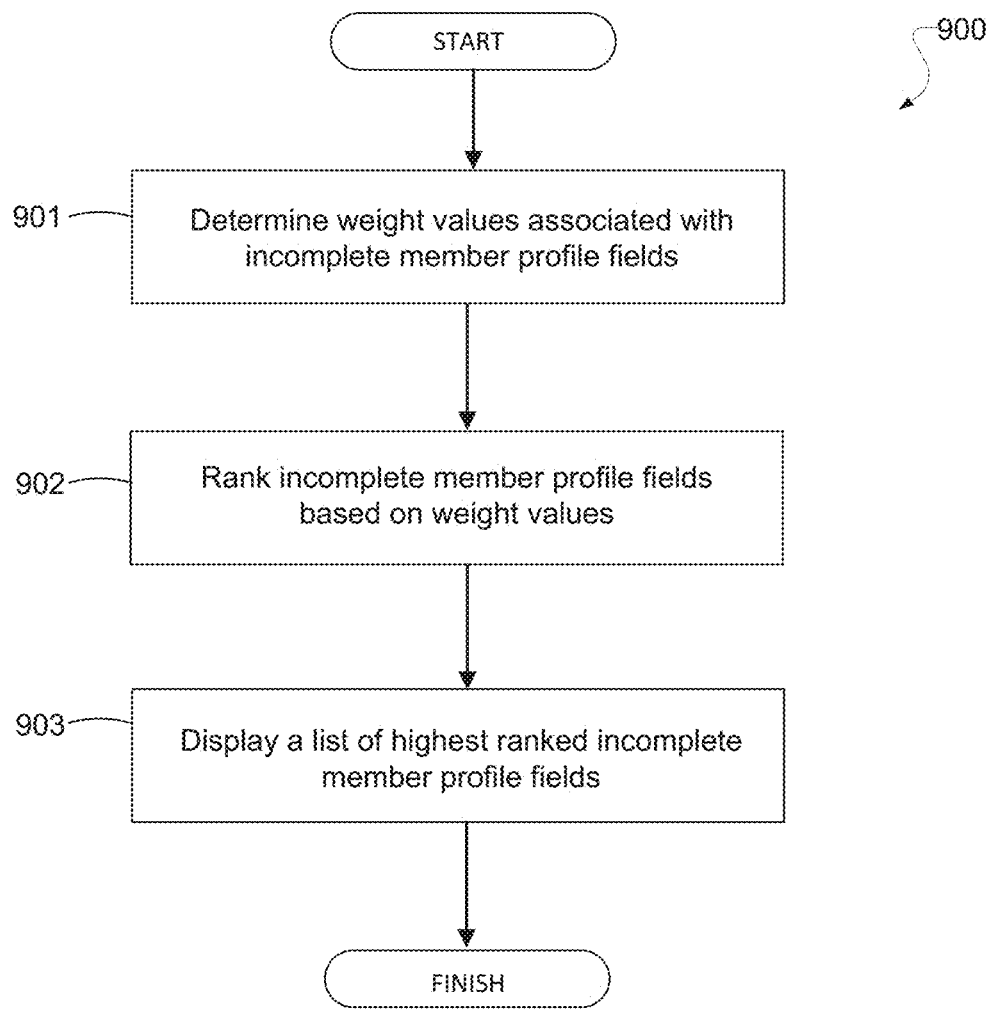
FIG. 9 is a flowchart illustrating an example method, according to various embodiments.

In some embodiments, weights for the member profile fields may be used to suggest which fields a member should prioritize completing. For example, if a member has not completed 10 fields, the system 200 may suggest that the member complete the missing field with the highest weight value, rather than suggest that the member complete all 10 missing fields. FIG. 9 is a flowchart illustrating an example method 900, consistent with various embodiments described herein. The method 900 may be performed at least in part by, for example, the profile completion score system 200 illustrated in FIG. 2 (or an apparatus having similar modules, such as one or more client machines or application servers). In operation 901, the scoring module 202 determines, based on accessed profile completion score criteria information (e.g., see FIG. 5), the profile completion score weight values associated with incomplete member profile fields in a member profile. In operation 902, the scoring module 202 ranks the incomplete member profile fields in the member profile, based on the profile completion score weight values (that were determined in operation 901) associated with each of the incomplete member profile fields. For example, the incomplete member profile fields with the higher profile completion score weight values may be ranked higher than the incomplete member profile fields with the lower profile completion score weight values. In operation 903, the scoring module 202 displays, via a user interface, a list of one or more of the highest ranked incomplete member profile fields (e.g., the top X fields) that were ranked in operation 902, together with a prompt recommending the member to complete these identified incomplete member profile fields. Alternatively, the scoring module 202 may display, via a user interface, the incomplete member profile fields with profile completion score weight values higher than a predetermined threshold, together with a prompt recommending the member to complete these identified incomplete member profile fields. It is contemplated that the operations of method 900 may incorporate any of the other features disclosed herein. Various operations in the method 900 may be omitted or rearranged.

Example Mobile Device

Figure 10:
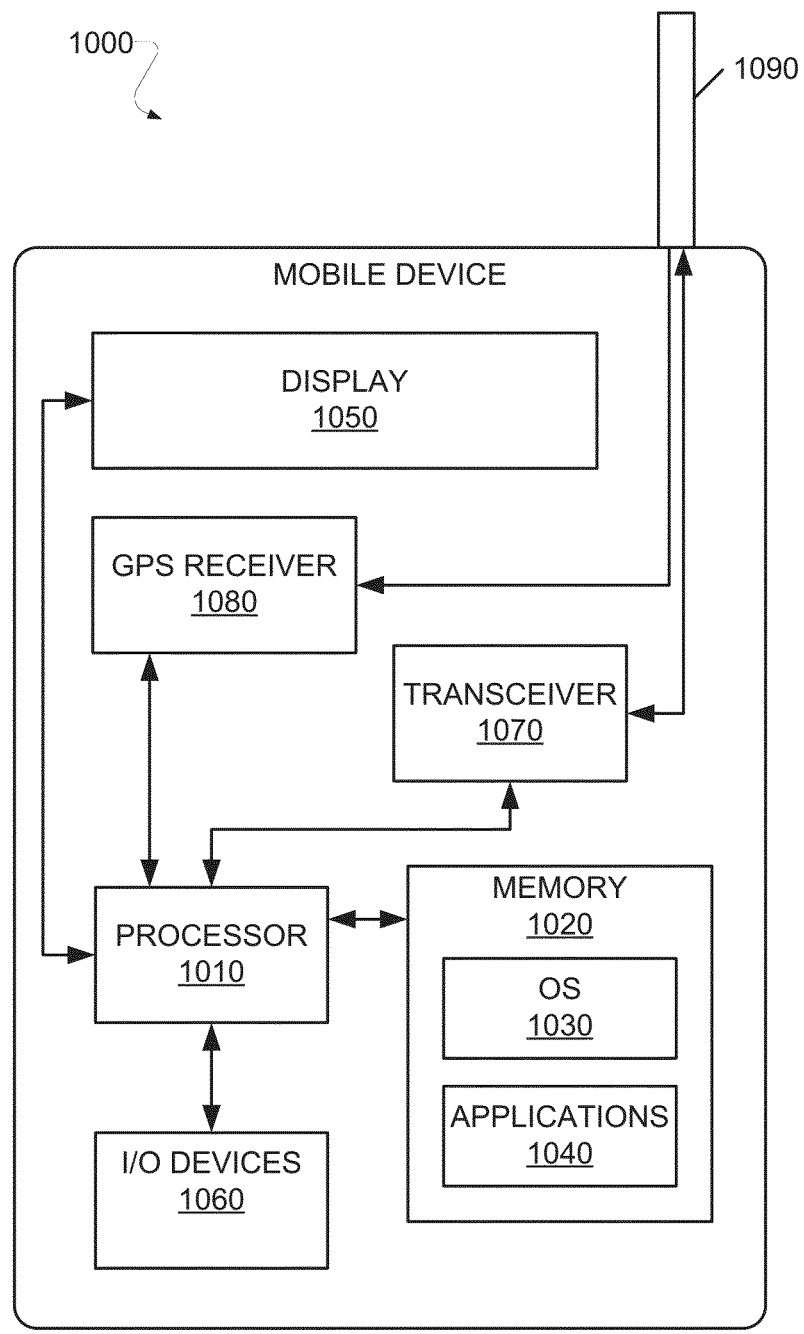
FIG. 10 illustrates an example mobile device, according to various embodiments.

FIG. 10 is a block diagram illustrating the mobile device 1000, according to an example embodiment. The mobile device may correspond to, for example, one or more client machines or application servers. One or more of the modules of the system 200 illustrated in FIG. 2 may be implemented on or executed by the mobile device 1000. The mobile device 1000 may include a processor 1010. The processor 1010 may be any of a variety of different types of commercially available processors suitable for mobile devices (for example, an XScale architecture microprocessor, a Microprocessor without Interlocked Pipeline Stages (MIPS) architecture processor, or another type of processor). A memory 1020, such as a Random Access Memory (RAM), a Flash memory, or other type of memory, is typically accessible to the processor 1010. The memory 1020 may be adapted to store an operating system (OS) 1030, as well as application programs 1040, such as a mobile location enabled application that may provide location based services to a user. The processor 1010 may be coupled, either directly or via appropriate intermediary hardware, to a display 1050 and to one or more input/output (I/O) devices 1060, such as a keypad, a touch panel sensor, a microphone, and the like. Similarly, in some embodiments, the processor 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile device 1000. Further, in some configurations, a GPS receiver 1080 may also make use of the antenna 1090 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 11:
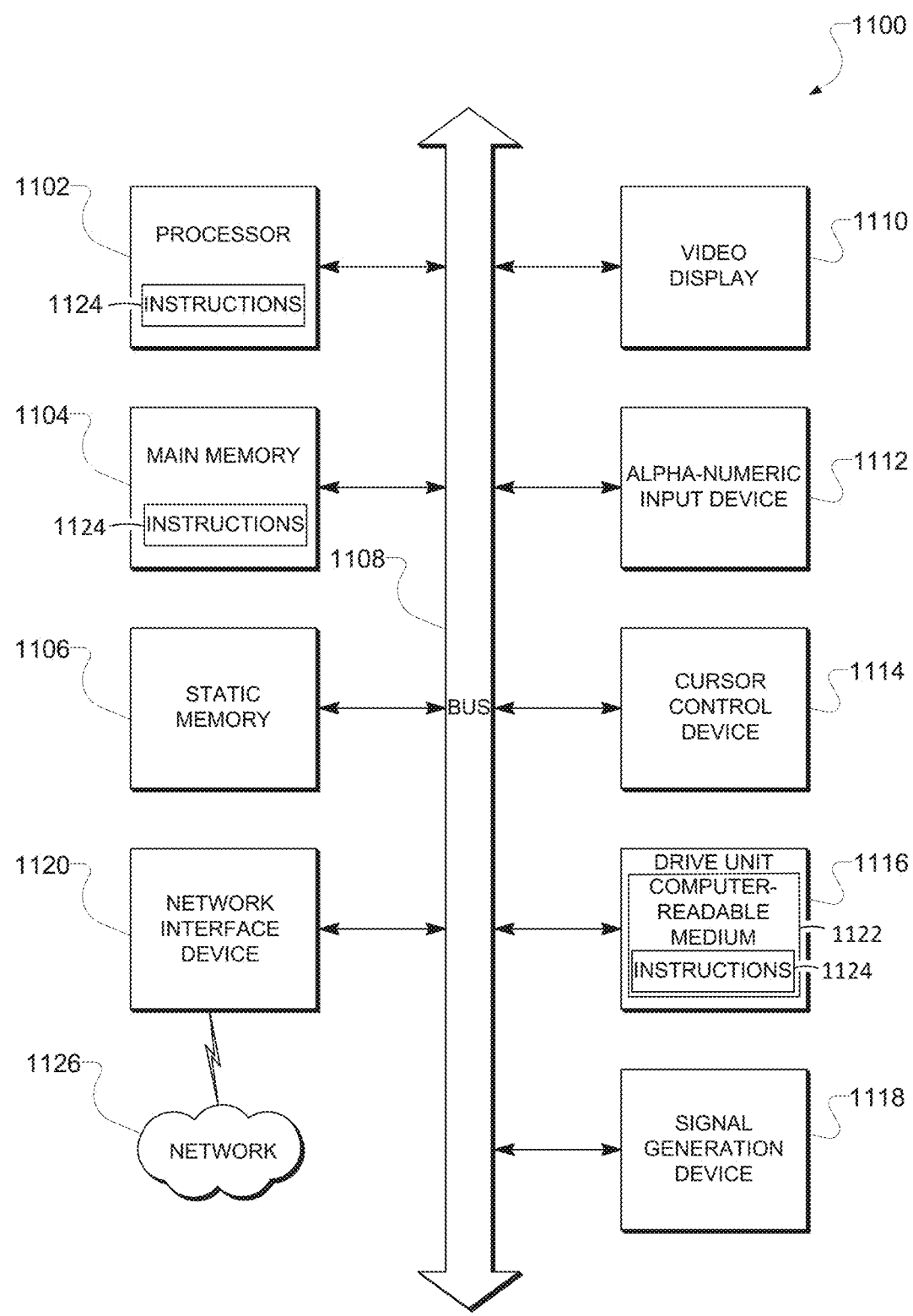
FIG. 11 is a diagrammatic representation of a machine in the example form of a computer system within which a set of instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    generating, based on a set of member profiles and historical metric data associated with the set of member profiles, a set of feature vectors representing the set of member profiles, each respective feature vector from the set of feature vectors corresponding to a separate one of the member profiles from the set of member profiles, each respective feature vector including a set of features corresponding to member profile fields of the respective member profile, and each respective feature vector including a metric value corresponding to an outcome metric associated with the respective member profile, a value of each the features being set to either a first value to indicate that the member profile field corresponding to the feature is completed in the respective member profile, or a second value to indicate that the member profile field corresponding to the feature has not been completed in the respective member profile;
    generating, based on the set of feature vectors, a mathematical model that determines a profile score weight value for a given member profile field, the profile score weight value indicating a predicted effect on the outcome metric resulting from completing the given member profile field;
    generating, based on the mathematical model, as set of profile completion score weight values, each profile score weight value corresponding to a respective member profile field from the set member profile fields available in member profiles of an online social networking service;
    accessing, from one or more databases, a specific member profile associated with a specific member of the online social networking service;
    identifying, based on the specific member profile, one or more member profile fields from the set of member profile fields that have been completed in the specific member profile;
    determining, based on a subset of the set of profile completion score weight values that correspond with the member profile fields that have been completed in the specific member profile, a profile completion score for the specific member profile;
    comparing the profile completion score to a threshold value, yielding a comparison; and
    selecting an email to transmit to the specific member based on the comparison.

2. The method of claim 1, wherein the outcome metric corresponds to a quantity of profile views received, a prominence of a member profile in search results, a quantity of messages received via a member profile, and a quantity of connection invitations received via a member profile.

3. The method of claim 1, wherein the outcome metric corresponds a total quantity of page views performed at the online social networking service and a total quantity of advertisement clicks performed at the online social networking service.

4. The method of claim 1, wherein generating the mathematical model comprises:
    for each of a plurality of outcome metrics, training the mathematical model to predict a value of the corresponding outcome metric based on a given completion status for each member profile field from the set of member profile fields for a given member profile.

5. The method of claim 1, further comprising displaying, via a user interface, the generated profile completion score.

6. The method of claim 1, further comprising:
    determining, based on the comparison, that the profile completion score is less than the threshold value;
    accessing the email from a set of one or more emails targeted at members having incomplete member profiles; and
    transmitting the email to the specific member.

7. The method of claim 6, wherein the email includes recommendations or advantages associated with completing a member profile.

8. The method of claim 1, further comprising:
    determining, based on the comparison, that the profile completion score meets or exceeds the threshold value;
    accessing the email from a set of one or more emails targeted at members having complete member profiles; and
    transmitting the email to the specific member.

9. The method of claim 1, further comprising:
    determining that a product feature or content item is relevant to the specific member, based on the comparison; and
    causing the product feature or content item to be displayed via a user interface viewable by the specific member.

10. The method of claim 1, wherein the set of member profile fields includes a profile picture, a company section, an education section, a certification section, an honors section, a project section, a course section, a volunteer section, a skills section, an industry section, a location section, an awards section, a publication section, and a patent section.

11. A system comprising:
    one or more computer processors; and one or more computer-readable mediums storing instructions that, when executed by the one or more computer processors, cause the system to perform operations comprising:
  generating, based on a set of member profiles and historical metric data associated with the set of member profiles, a set of feature vectors representing the set of member profiles, each respective feature vector from the set of feature vectors corresponding to a separate one of the member profiles from the set of member profiles, each respective feature vector including a set of features corresponding to member profile fields of the respective member profile, and each respective feature vector including a metric value corresponding to an outcome metric associated with the respective member profile, a value of each the features being set to either a first value to indicate that the member profile field corresponding to the feature is completed in the respective member profile, or a second value to indicate that the member profile field corresponding to the feature has not been completed in the respective member profile;
  generating, based on the set of feature vectors, a mathematical model that determines a profile score weight value for a given member profile field, the profile score weight value indicating a predicted effect on the outcome metric resulting from completing the given member profile field;
  generating, based on the mathematical model, as set of profile completion score weight values, each profile score weight value corresponding to a respective member profile field from the set member profile fields available in member profiles of an online social networking service;
  accessing, from one or more databases, a specific member profile associated with a specific member of the online social networking service;
  identifying, based on the specific member profile, one or more member profile fields from the set of member profile fields that have been completed in the specific member profile;
  determining, based on a subset of the set of profile completion score weight values that correspond with the member profile fields that have been completed in the specific member profile, a profile completion score for the specific member profile;
  comparing the profile completion score to a threshold value, yielding a comparison; and
  selecting an email to transmit to the specific member based on the comparison.

12. The system of claim 11, wherein the outcome metric corresponds to a quantity of profile views received, a prominence of a member profile in search results, a quantity of messages received via a member profile, and a quantity of connection invitations received via a member profile.

13. The system of claim 11, wherein generating the mathematical model comprises:
  for each of a plurality of outcome metrics, training the mathematical model to predict a value of the corresponding outcome metric based on a given completion status for each member profile field from the set of member profile fields for a given member profile.

14. The system of claim 11, the operations further comprising:
  determining, based on the comparison, that the profile completion score is less than the threshold value;
  accessing the email from a set of one or more emails targeted at members having incomplete member profiles; and
  transmitting the email to the specific member.

15. The system of claim 11, the operations further comprising:
  determining, based on the comparison, that the profile completion score meets or exceeds the threshold value;
  accessing the email from a set of one or more emails targeted at members having complete member profiles; and
  transmitting the email to the specific member.

16. A non-transitory computer-readable medium storing instructions that, when executed by one or more computer processors of a computing system, cause the computing system to perform operations comprising:
  generating, based on a set of member profiles and historical metric data associated with the set of member profiles, a set of feature vectors representing the set of member profiles, each respective feature vector from the set of feature vectors corresponding to a separate one of the member profiles from the set of member profiles, each respective feature vector including a set of features corresponding to member profile fields of the respective member profile, and each respective feature vector including a metric value corresponding to an outcome metric associated with the respective member profile, a value of each the features being set to either a first value to indicate that the member profile field corresponding to the feature is completed in the respective member profile, or a second value to indicate that the member profile field corresponding to the feature has not been completed in the respective member profile;
  generating, based on the set of feature vectors, a mathematical model that determines a profile score weight value for a given member profile field, the profile score weight value indicating a predicted effect on the outcome metric resulting from completing the given member profile field;
  generating, based on the mathematical model, as set of profile completion score weight values, each profile score weight value corresponding to a respective member profile field from the set member profile fields available in member profiles of an online social networking service;
  accessing, from one or more databases, a specific member profile associated with a specific member of the online social networking service;
  identifying, based on the specific member profile, one or more member profile fields from the set of member profile fields that have been completed in the specific member profile;
  determining, based on a subset of the set of profile completion score weight values that correspond with the member profile fields that have been completed in the specific member profile, a profile completion score for the specific member profile;
  comparing the profile completion score to a threshold value, yielding a comparison; and
  selecting an email to transmit to the specific member based on the comparison.

17. The non-transitory computer-readable medium of claim 16, wherein the outcome metric corresponds to a quantity of profile views received, a prominence of a member profile in search results, a quantity of messages received via a member profile, and a quantity of connection invitations received via a member profile.

18. The non-transitory computer-readable medium of claim 16, wherein generating the mathematical model comprises:
for each of a plurality of outcome metrics, training the mathematical model to predict a value of the corresponding outcome metric based on a given completion status for each member profile field from the set of member profile fields for a given member profile.

19. The non-transitory computer-readable medium of claim 16, the operations further comprising:
determining, based on the comparison, that the profile completion score is less than the threshold value;
accessing the email from a set of one or more emails targeted at members having incomplete member profiles; and
transmitting the email to the specific member.

20. The non-transitory computer-readable medium of claim 16, the operations further comprising:
determining, based on the comparison, that the profile completion score meets or exceeds the threshold value;
accessing the email from a set of one or more emails targeted at members having complete member profiles; and
transmitting the email to the specific member.

* * * * *